United States Patent
Dey et al.

(10) Patent No.: US 11,172,123 B2
(45) Date of Patent: *Nov. 9, 2021

(54) COMPUTER PROGRAM PRODUCT FOR CONTEXTUAL FOCUS/ZOOM OF EVENT CELEBRITIES

(71) Applicant: International Business Machines Corporation, Armonk, NY (US)

(72) Inventors: Kuntal Dey, New Delhi (IN); Seema Nagar, Bangalore (IN); Sudhanshu Shekhar Singh, New Delhi (IN); Enara C. Vijil, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/668,654

(22) Filed: Oct. 30, 2019

(65) Prior Publication Data

US 2020/0068120 A1  Feb. 27, 2020

Related U.S. Application Data

(63) Continuation of application No. 16/119,498, filed on Aug. 31, 2018, now Pat. No. 10,560,626, which is a
(Continued)

(51) Int. Cl.
*H04N 5/232* (2006.01)
*G06K 9/00* (2006.01)
*G06K 9/32* (2006.01)

(52) U.S. Cl.
CPC ..... *H04N 5/23219* (2013.01); *G06K 9/00228* (2013.01); *G06K 9/00268* (2013.01);
(Continued)

(58) Field of Classification Search
CPC .......... H04N 5/23219; H04N 5/23216; H04N 5/23212; H04N 5/23206; H04N 2101/00;
(Continued)

(56) References Cited

U.S. PATENT DOCUMENTS 6,606,398 B2 *  8/2003  Cooper ................. G06F 16/583
                                                      382/118
6,608,563 B2 *  8/2003  Weston .................. G06F 16/58
                                                      340/573.1
(Continued)

FOREIGN PATENT DOCUMENTS

WO     WO 2015/006750 A1     1/2015

OTHER PUBLICATIONS

United States Notice of Allowance dated Oct. 4, 2019, in U.S. Appl. No. 16/119,498.
(Continued)

*Primary Examiner* — Pritham D Prabhakher
(74) *Attorney, Agent, or Firm* — Anthony Curro, Esq.; McGinn I.P. Law Group, PLLC.

(57) ABSTRACT

A contextual zoom control method, system, and computer program product, includes in a single individual capturing mode, performing a camera function to assist the user in performing an image capturing action on an identity that is paired with a highest ranked individual on a ranked list within a set of key individuals attending an event, where the camera function includes at least one of a zoom function and a focus function and where the set of key individuals attending the event are determined by any of data mining a context of the event, a search engine, a social media source, and using natural language processing on a published program of the event.

13 Claims, 5 Drawing Sheets

Related U.S. Application Data continuation of application No. 15/401,864, filed on Jan. 9, 2017, now Pat. No. 10,136,049.

(52) U.S. Cl.
CPC ....... *G06K 9/00288* (2013.01); *G06K 9/3233* (2013.01); *H04N 5/23245* (2013.01); *H04N 5/23296* (2013.01); *H04N 5/232127* (2018.08)

(58) Field of Classification Search
CPC ............ G06F 17/3028; G06K 9/00255; G06K 9/00671; G06K 9/00677; G06K 9/6267; G06K 9/00221; G06K 9/00228; G06K 9/00268; G06K 9/00288; G06K 2009/003628

See application file for complete search history.

(56) References Cited

U.S. PATENT DOCUMENTS

| | | | |
|---|---|---|---|
| 7,924,340 B2* | 4/2011 | Kato | G06K 9/00255 348/333.05 |
| 8,542,885 B2 | 9/2013 | Abe | |
| 8,917,913 B2 | 12/2014 | Kritt et al. | |
| 9,077,888 B2 | 7/2015 | Luong | |
| 9,210,313 B1* | 12/2015 | Svendsen | G06F 3/041 |
| 9,210,319 B2 | 12/2015 | Rav-Acha et al. | |
| 9,286,641 B2* | 3/2016 | Bosworth | G06F 16/951 |
| 9,444,990 B2 | 9/2016 | Jensen et al. | |
| 9,465,993 B2* | 10/2016 | Krupka | G06K 9/6218 |
| 9,489,564 B2* | 11/2016 | Gattuso | H04N 5/23219 |
| 9,773,156 B2 | 9/2017 | Chan et al. | |
| 9,818,024 B2 | 11/2017 | Bacivarov et al. | |
| 9,830,727 B2 | 11/2017 | Henry et al. | |
| 9,875,255 B2* | 1/2018 | Yoo | G06K 9/00677 |
| 9,881,202 B2 | 1/2018 | Babacan et al. | |
| 10,218,898 B2* | 2/2019 | Bostick | H04N 5/23222 |
| 10,296,811 B2* | 5/2019 | Krupka | G06K 9/00288 |
| 2007/0195174 A1* | 8/2007 | Oren | H04N 5/23219 348/222.1 |
| 2008/0117310 A1 | 5/2008 | Kaneda et al. | |
| 2008/0240563 A1* | 10/2008 | Takano | G06K 9/00308 382/173 |
| 2008/0270425 A1* | 10/2008 | Cotgreave | G06F 16/583 |
| 2008/0292299 A1 | 11/2008 | Kretz et al. | |
| 2008/0317285 A1 | 12/2008 | Abe | |
| 2009/0096871 A1 | 4/2009 | Kuwano et al. | |
| 2010/0231753 A1* | 9/2010 | Hagiwara | H04N 5/23225 348/231.6 |
| 2011/0268323 A1* | 11/2011 | Gallagher | G06F 16/58 382/118 |
| 2012/0044384 A1 | 2/2012 | Shibagami | |
| 2012/0054691 A1 | 3/2012 | Nurmi | |
| 2012/0120283 A1* | 5/2012 | Capata | G06K 9/00255 348/241 |
| 2012/0206619 A1* | 8/2012 | Nitta | H04N 5/23218 348/222.1 |
| 2013/0035742 A1 | 2/2013 | Talbot et al. | |
| 2013/0121540 A1 | 5/2013 | Garcia et al. | |
| 2013/0136313 A1* | 5/2013 | Maeda | G06F 16/583 382/111 |
| 2013/0169853 A1* | 7/2013 | Luong | H04N 5/232933 348/345 |
| 2013/0262565 A1 | 10/2013 | Nakamura et al. | |
| 2014/0341425 A1* | 11/2014 | Babacan | G06K 9/00228 382/103 |
| 2015/0015735 A1 | 1/2015 | Rav-Acha et al. | |
| 2015/0016693 A1* | 1/2015 | Gattuso | H04N 5/23219 382/118 |
| 2015/0213305 A1* | 7/2015 | Sundstrom | G06F 16/54 382/118 |
| 2015/0288874 A1* | 10/2015 | Sivan | H05K 999/99 348/207.11 |
| 2016/0021293 A1* | 1/2016 | Jensen | G06K 9/00677 348/349 |
| 2017/0032178 A1* | 2/2017 | Henry | G06K 9/00288 |
| 2017/0339339 A1* | 11/2017 | De Bayser | H04N 5/23216 |
| 2017/0357877 A1* | 12/2017 | Lin | G06F 16/58 |
| 2018/0077344 A1* | 3/2018 | Bostick | H04N 5/23219 |

OTHER PUBLICATIONS

United States Office Action dated Sep. 6, 2019, in U.S. Appl. No. 16/119,498.
United States Office Action dated Jul. 30, 2019, in U.S. Appl. No. 16/119,498.
United States Notice of Allowance dated Jul. 12, 2018, in U.S. Appl. No. 15/401,864.
United States Office Action dated Jun. 4, 2018, in U.S. Appl. No. 15/401,864.
United States Office Action dated Mar. 16, 2018, in U.S. Appl. No. 15/401,864.
Mel, et al. "The NIST Definition of Cloud Computing". Recommendations of the National Institute of Standards and Technology. Nov. 16, 2015.

\* cited by examiner

COMPUTER PROGRAM PRODUCT FOR CONTEXTUAL FOCUS/ZOOM OF EVENT CELEBRITIES

CROSS-REFERENCE TO RELATED APPLICATIONS

The present application is a Continuation Application of U.S. patent application Ser. No. 16/119,498, filed on Aug. 31, 2018, which is a Continuation Application of U.S. patent application Ser. No. 15/401,864, now U.S. Pat. No. 10,136,049, issued on Nov. 20, 2018, the entire contents of which are hereby incorporated by reference.

BACKGROUND

The present invention relates generally to a contextual zoom control method, and more particularly, but not by way of limitation, to a system, method, and computer program product for assisting photographers, using smart phones and/or smart cameras for taking a photograph, in selecting a celebrity on which to (contextually) zoom their camera lens focus.

Capturing photographs of celebrities is one of the most significant activities that happens every day with a camera (including smartphones). Most of the individuals go to shows, sports events, concerts, theaters and so on, with their smartphones and at times smart cameras, and attempt to capture pictures of the celebrities that perform on the show, or make guest appearances (on shows, near the shows on the VIP seats or reserved areas, etc.).

Conventionally, camera focus/zoom techniques are well-known. However, such techniques are context-agnostic and the target person's identity-agnostic.

SUMMARY

In an exemplary embodiment, the present invention can provide a computer-implemented contextual zoom control method, the method including detecting faces in an area of interest when a user is performing an image capturing action, extracting a facial image for each of a set of key individuals attending an event where the user is performing the image capturing action, creating a ranked list of the set of key individuals according to a popularity of each key individual, pairing each detected face with a matching extracted facial image to label an identity of each key individual in the area of interest, and in a single individual capturing mode, performing a camera function to assist the user in performing the image capturing action on the identity that is paired with a highest ranked individual on the ranked list within the area of interest.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
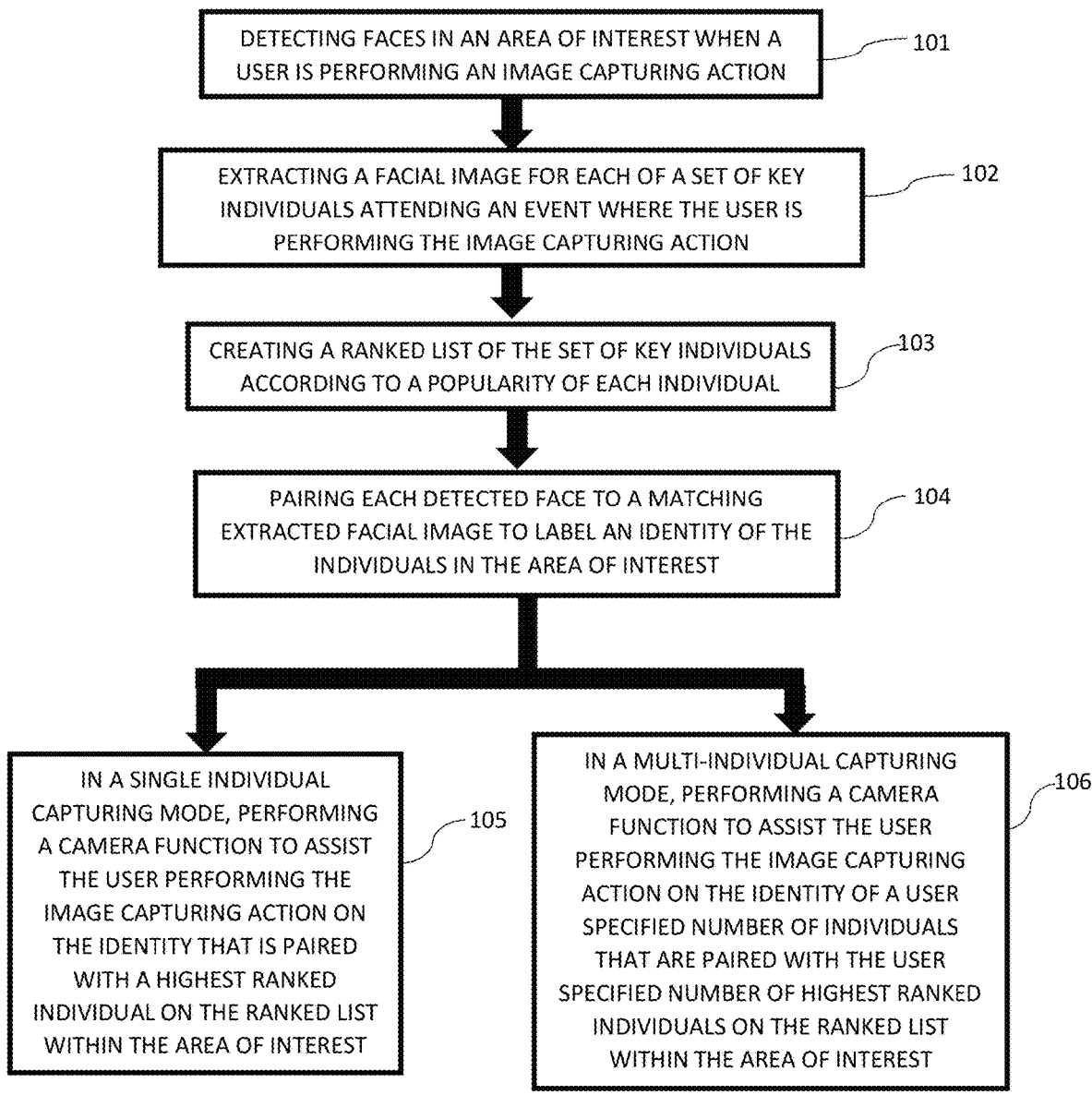
FIG. 1 exemplarily shows a high-level flow chart for a contextual zoom control method 100 according to an embodiment of the present invention.
Figure 2:
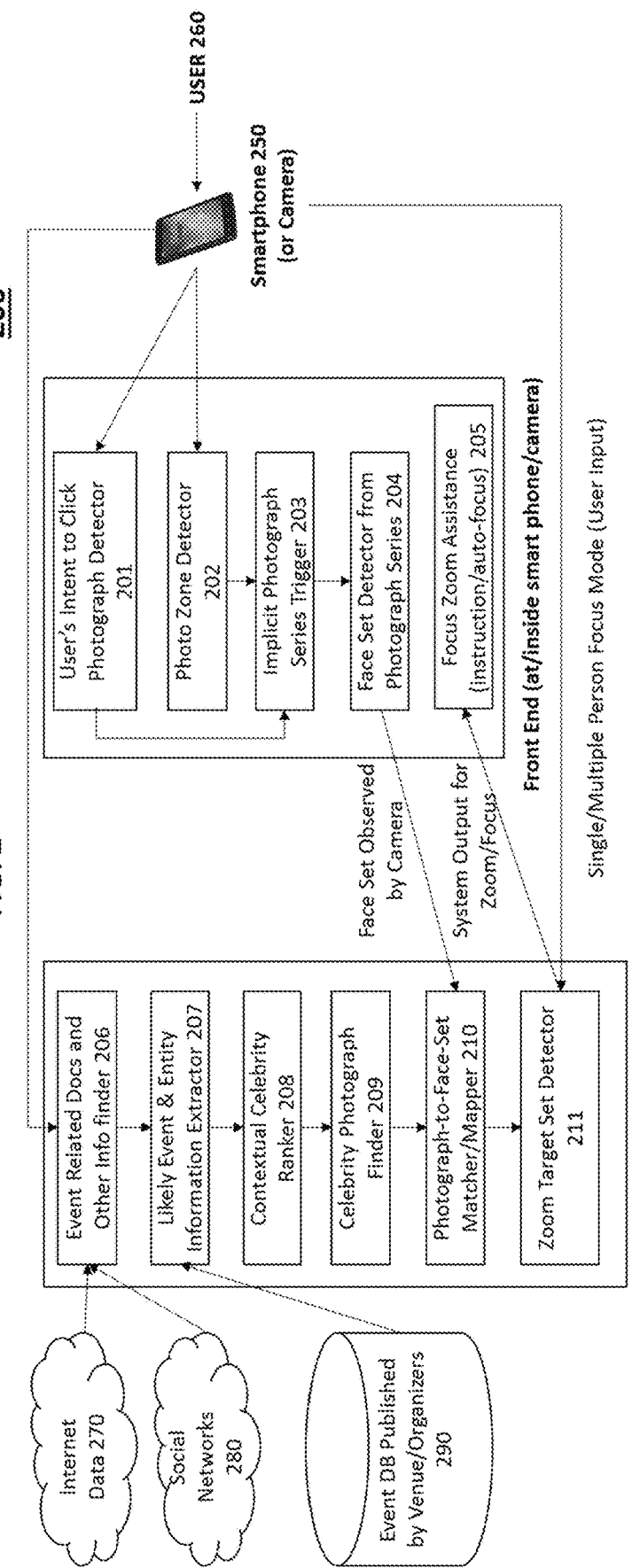
FIG. 2 exemplarily depicts an exemplary system 200 diagram according to an embodiment of the present invention.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of a contextual zoom control method 100 according to the present invention can include various steps for assisting photographers, using smart phones and/or smart cameras for taking a photograph, in selecting celebrities on which to (contextually) zoom their camera lens focus, when an attempt of a user to zoom onto an expected celebrity present nearby in the same location is detected, with a potential intent to click a photograph of the celebrity (and optionally auto-click the picture too). By way of introduction of the example depicted in FIG. 2, one or more computers of a computer system 12 according to an embodiment of the present invention can include a memory 28 having instructions stored in a storage system to perform the steps of FIG. 1.

Thus, a contextual zoom control method 100 according to an embodiment of the present invention may act in a more sophisticated, useful and cognitive manner, giving the impression of cognitive mental abilities and processes related to knowledge, attention, memory, judgment and evaluation, reasoning, and advanced computation. In other words, a "cognitive" system can be said to be one that possesses macro-scale properties—perception, goal-oriented behavior, learning/memory and actions generally recognized as cognitive.

Although one or more embodiments may be implemented in a cloud environment 50 (see e.g., FIG. 3), it is nonetheless understood that the present invention can be implemented outside of the cloud environment.

In the description herein, the term "camera function" refers to a zoom function, a focus function, red-eye elimination function, flash function, etc. that a camera can perform. Further, it is noted that "zoom" and "focus" are used interchangeably and refer to an automated action that the camera takes to either zoom on a face or focus a face in the image. Also, "an area of interest" refers to the imaging view screen of the camera device and the area that the image is capturing.

Referring now to FIG. 1, in step 101, faces in an area of interest when a user if performing an image capturing action are detected. That is, the user's intent to capture a photograph is detected, by the user's action of switching on the camera (or the smartphone's camera application or smart camera). Further, the approximate area of interest of the user to capture the photograph is detected, by the manual movement and attempt to set the focus of the camera. The area of interest corresponds to the area in which the user is taking the image. As the user zooms the he camera onto a location or attempts to focus the area of interest, faces of the individuals in the area of interest are detected using facial recognition software, by taking hidden images (e.g., not shown to the user and only saved in metadata), etc. One or more faces are detected from the area of interest and the faces are treated as a first input set "$i_1$" (as described later).

In step 102, a facial image is extracted for each of a set of key individuals attending an event where the user is performing the image capturing action. That is, the most likely event is extracted as well as a facial image for a set of key individuals (e.g., such as celebrities) expected to participate in the event are detected using a context of the event (e.g., location and current time), a search process is conducted on a public search engine (such as Google, Bing etc.) as well as social networks (such as Twitter, Facebook, Instagram, etc.), and using natural language processing techniques (NLP) for the program of the event (e.g., in a case that the event venue publishes any information, then that information is also processed to find the expected individuals (including celebrities) to participate in the program). In other words, the celebrities at an event are identified and a facial image for each of the celebrities is data mined.

In step 103, a ranked list of the set of key individuals is created according to a predetermined parameter (e.g., popularity of each individual). For example, if five celebrities are attending the event, the five celebrities are ranked from first to fifth according to popularity. That is, when multiple celebrities are detected in step 102/103, a popularity ranking technique is invoked (such as, a web keyword popularity technique, or external data feed sources). "Popularity" also may be measured by a number of google hits associated with the identity of the person, a number of articles published by the person, a number of newspaper articles on the person, etc. It is noted that instead of popularity, another parameter could be used to rank individuals such as notoriety (e.g., a notorious individual may not be popular), a documented success, a net worth, etc.

It is noted that in step 102 and step 103, the facial image of each participating celebrity is extracted in step 102 and associated with the ranked list created in step 103. The association of the facial image to a celebrity and their corresponding popularity rank is treated as second input set "$i_2$".

In step 104, each detected face from step 101 is paired with a matching extracted facial image from step 102 to label an identity of the person in the area of interest. In other words, each face in the area of interest is paired with a facial image, then the identity of the facial image paired with the face is confirmed as the identity of the individual. For example, if a face in the area of interest matches with a facial image of Barack Obama, the identity of the individual is labeled as "Barack Obama". In this manner, the identity of the celebrities in the area of interest is labeled in order to perform a camera function (as described later).

That is, in step 104, the first input "$i_1$" and second input "$i_2$" are matched, and a ranked list of celebrities present in the set "$i_1$" is output, where the ranking is based upon a combination (a policy-dependent function) of the popularity of the celebrity and the proximity of the user's camera's center of focus to the set of celebrities visible within the focus-zone of the camera.

In step 105, the camera is selectively (optionally) utilizing a single individual capturing mode. The single individual capturing mode indicates that the user would like to zoom/focus only on a single celebrity in the area of interest of the image. Therefore, in step 105, a camera function is performed to assist the user in performing the image capturing action on the identity that is paired with a highest ranked individual on the ranked list within the area of interest. In other words, step 105 causes the camera to zoom in (or focus on) on the most popular celebrity within the area of interest. In this manner, the user merely must point their camera in a direction of the desired celebrity they wish to photograph and the camera automatically zooms and focuses on the celebrity.

In some embodiments, in step 105, the user is requested to select which celebrity on the ranked list on which the user would like the camera function to be performed. For example, the ranked list can be displayed on a display screen of the camera device as a graphical user interface (GUI) and the user can select which celebrity on the list they would like to have imaged. Thus, the user can select any celebrity on the list regardless of the ranking.

In other embodiments, the user can confirm that the identity of the individual is correct based on which individual is imaged. In this manner, the method can act as a "cognitive" method and become smarter over iterations of the method in which the correlation between individuals and faces is improved with user feedback. For example, if the camera function is performed on a non-important individual (i.e., not a celebrity), then the user can return this feedback.

Thus, if the user uses a "single individual capturing mode", then the camera can help the user zoom on the first entity on the list, and if the user indicates that to be not the desired target (e.g., by pressing a button showed on screen, etc.) then the camera can help the user zoom on to the second entity on the list, and so on.

In step 106, the camera is utilizing a multi-individual capturing mode. The multi-individual capturing mode indicates that the user would like to zoom/focus on a plurality of celebrities in the area of interest of the image. Therefore, in step 106, a camera function is performed to assist the user in performing the image capturing action on the identity of a user-specified number of individuals that are paired with the user-specified number of highest ranked individuals on the ranked list within the area of interest. In other words, if the user specifies that they want "n" number of individuals in their image, the camera function is performed such that the "n" number of highest ranked popular celebrities are within the area of interest after the zoom/focus function is performed. For example, if two celebrities are standing side by side, the single individual capturing mode only captures the most popular of the two. However, if the user indicates that they would like to capture two celebrities, both celebrities would be within the area of interest after the camera function is performed.

In some embodiments, the user does not need to specify the number of individuals for the multi-individual capturing mode and instead the number of individuals is based on a popularity factor of the individuals being above a predetermined threshold value. For example, each celebrity can be assigned a popularity value in the ranked list. The number of individuals to perform the camera function and keep within the area of interest can be based on the number of celebrities in the area of interest being above a predetermined threshold.

Thus, if the user uses a "multi-individual capturing mode" and specifies the maximum number of celebrities "n" she wants within the focus area, then the camera will search for the top "n" (or lesser number of) celebrities (the argmax) within the focus area where the combination function of the user's camera's center of focus and the popularity of the celebrity gives a maxima.

In some embodiments, the system 200 can execute the method 100 thereon. For example, a user 260 can use their smartphone 250 and a user's intent to click photograph detector 201 and photo zone detector 202 can detect faces in an area of interest when the user is performing an image capturing action. At this point the implicit photograph series trigger 203 begins imaging (or activating a facial recognition software) within the area of interest and the face set detector from the photograph series 204 extracts the faces within the area of interest.

At the same point, when the user is using the imaging device 250, the event related documents and other information finder 206, the likely event and entity information extractor 207, and the celebrity photograph finder 209 extract a facial image for each of a set of key individuals attending an event where the user is performing the image capturing action from the internet data 270, the social networks 280, and the event database 290. Also, the contextual celebrity ranker 208 creates a ranked list of the set of key individuals according to a popularity of each individual.

The photograph-to-face-set matcher/mapper 210 pairs the faces within the area of interest to the facial images extracted by the celebrity photograph finder 209 to label an identity of the person in the area of interest.

The zoom target set detector 211 interacts with the focus zoom assistance 205 on the smartphone 250 to either perform the single individual capturing mode or the multi-individual capturing mode described above in steps 105 and 106.

Thereby, the system 200 and associated method 100 can assist photographers, using smart phones and/or smart cameras for taking the photograph, in selecting celebrities to (contextually) zoom their camera lens focus on, when an attempt of an user to zoom onto an expected celebrity present nearby in the same location is detected, with a potential intent to click a photograph of the celebrity (and optionally auto-click the picture too). That is, the invention may be useful in settings where the photographer is located within the same (and visible) zone as the celebrity, but is far enough away that a zoom of camera focus is needed to get a good-quality picture, and optionally there are multiple faces available around the zooming zone.

For example, when a whole basketball team is present together on the ground (e.g., queueing up just before a match), and a spectator carrying a smartphone wants to capture a photo of the face of Stephan Curry rather than of the entire team, the spectator can indicate this intent to the system and the system in return will help the spectator identify and zoom the focus onto Stephan Curry (and optionally, auto-click a picture of Stephan Curry as well).

In one embodiment, a user is attending the Flushing Meadows tennis stadium in New York to watch the United States Open Tennis Championships and it is the final match, with Novak Djokovic facing Roger Federer. The user tries focus his smart camera to on Novak Djokovic, to get a photograph. An "intent to click photograph" action is triggered (e.g., step 101). Djokovic, his coach, the lineswoman visible in the background, a ball boy who is waiting nearby and an official, all are in the camera focus, as the user tries to zoom the view of his smart camera onto Novak (and is in a "single person focus mode" with his smart camera). At this stage, the camera takes an implicit photograph of this set of people and detects the faces (e.g., step 101). The smart camera also finds out the location from a Global Positioning System (GPS), and uses the GPS as well as the current time of the day to find the current event name, thereby understanding that Roger Federer and Novak Djokovic are two key people present in the event. In step 102, photographs (pictures) of Roger Federer and Novak Djokovic are searched for and retrieves a set of pictures of faces of these two celebrities. Now, an image match technique is conducted for the faces within the area of interest and the pictures retrieved of the celebrities, and it is found that the face of Novak Djokovic is the match (e.g., step 103). The camera assists the user to focus onto Novak Djokovic, and optionally auto-clicks one or more photos of Novak Djokovic also.

In the multi-individual capturing mode, the user attempts to take a picture of Roger and Novak, when they are near the net for the toss, but the umpire is between them when viewed from the zone where the user is trying to get the photo from (his seat in the stadium)—however, the boy assisting the umpire is beside Roger. The faces are paired with matching pictures of each of Roger and Novak to label their identity and then the camera zooms and/or focuses on Roger and Novak to obtain the best possible image even if the image includes the umpire between them. That is, the multi-individual capturing mode maximizes the view score where the focus combiner Roger, Novak and the umpire, but excludes the assisting boy. It is noted that if the assisting boy were a different celebrity tennis player who was ranked third on the popularity list and the user specified that they would like only two individuals imaged, the different celebrity tennis player would also be excluded. Also, if the different celebrity tennis player was more popular on the ranked list than. Roger and Novak, the camera function would zoom or focus on the different tennis player and the more popular of Roger and Novak.

It is noted that the examples above dealt with the most popular tennis players. However, the invention is not limited thereto. That is, if another celebrity (e.g., Paul McCartney) was present and he was higher on the popularity list, in a single mode Paul McCartney (or the most popular of the people) would be pictured.

Also, the embodiments herein refer generally to popularity ranking. However, a user can specify the ranking mode such as based on popularity, notoriety, net worth, platinum records, etc.

Exemplars Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
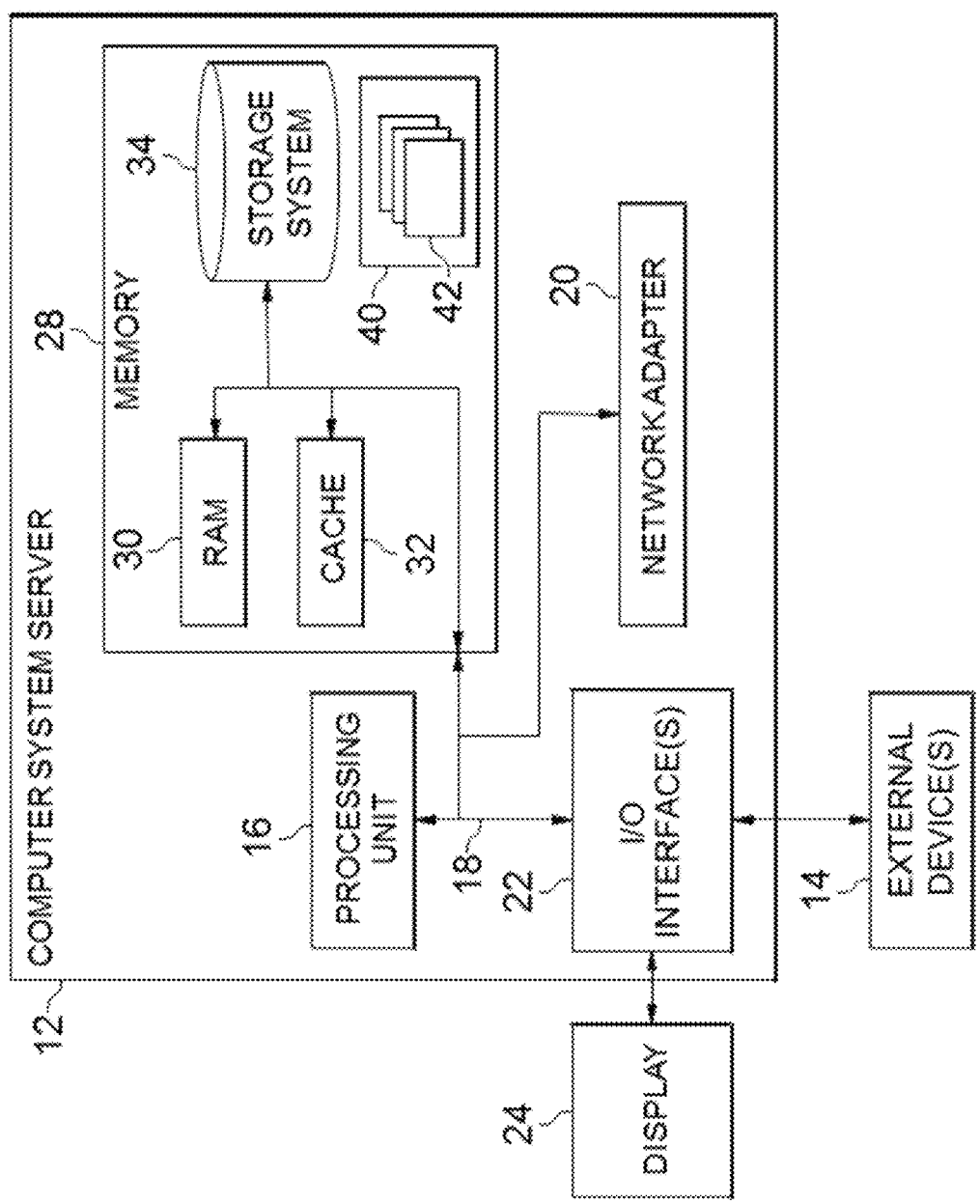
FIG. 3 depicts a cloud-computing node 10 according to an embodiment of the present invention.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or more program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
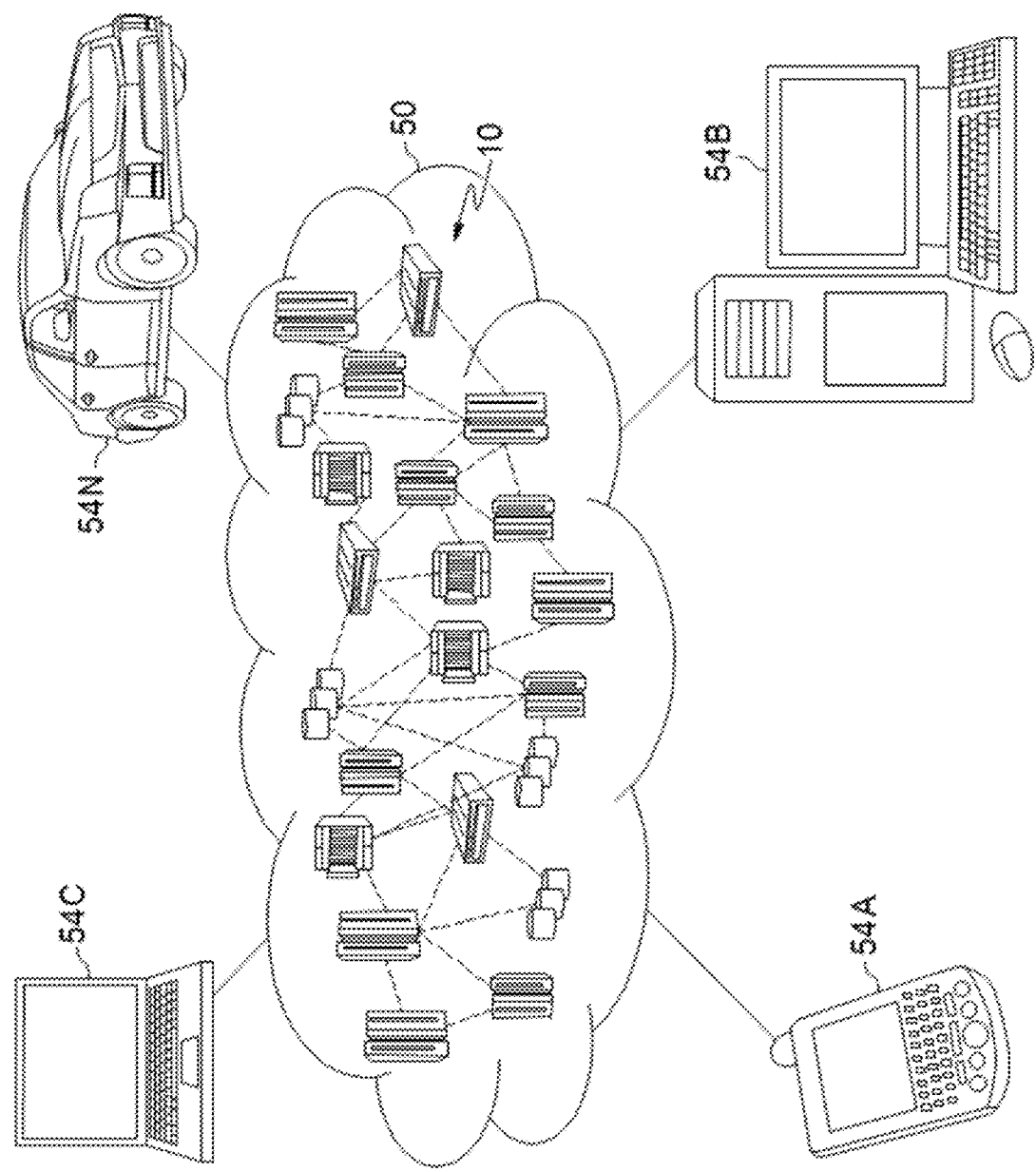
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
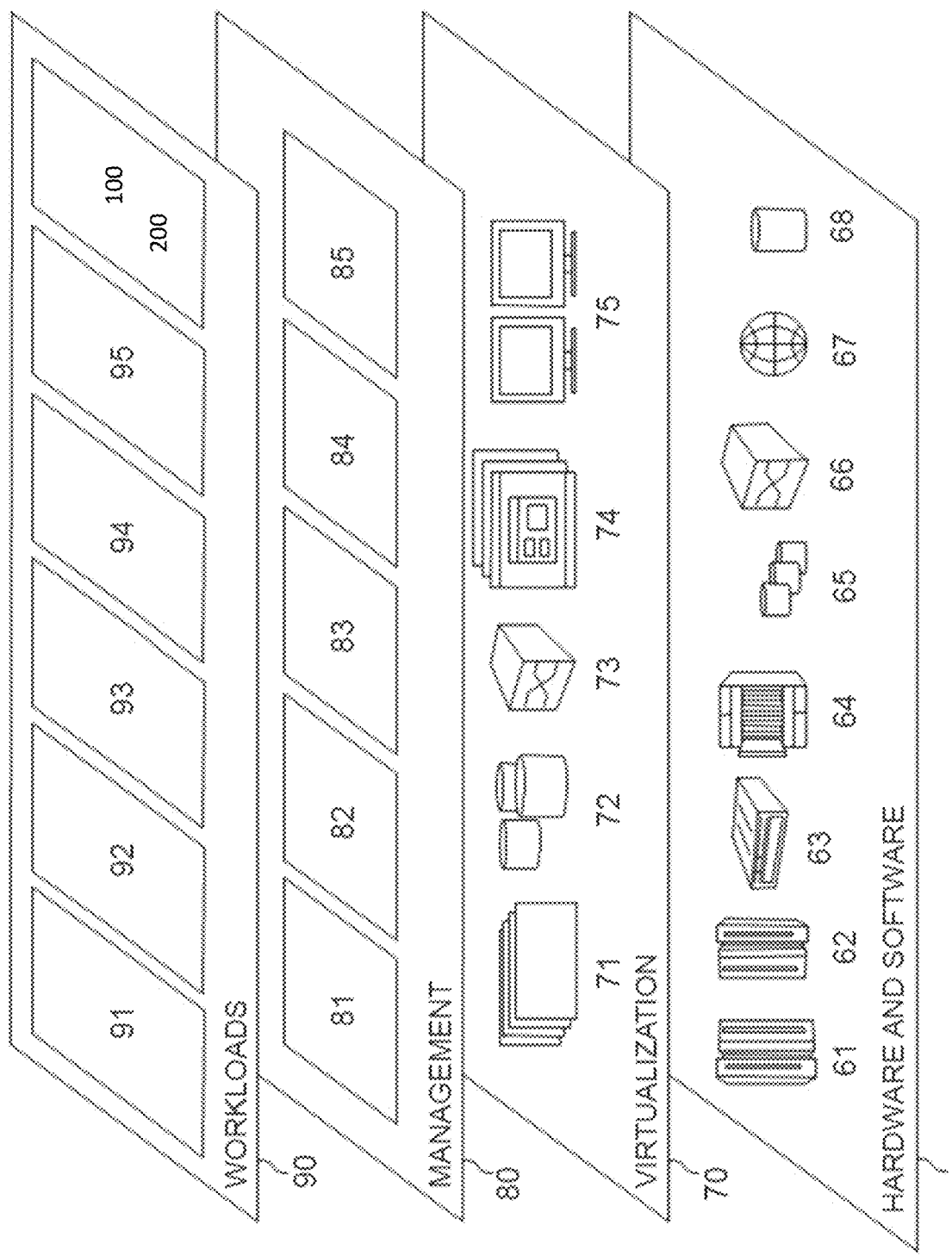
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and contextual zoom control method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented contextual zoom control method, the method comprising:
    in a single individual capturing mode, performing a camera function to assist the user in performing an image capturing action on an identity that is paired with a highest ranked individual on a ranked list within a set of key individuals attending an event,
    wherein the camera function includes an automated action,
    wherein the set of key individuals attending the event are determined by processing data of the event and the highest ranked individual is determined by comparing the set of key individuals to a quantity of appearances in an external data feed source, the quantity being greater than a threshold value, and
    wherein the camera function is performed on the identity that is paired with the highest ranked individual to enhance an image quality of an image captured of the highest ranked individual.

2. The computer-implemented method of claim 1, wherein, in response to performing the camera function in the single individual capturing mode, requesting that the user submit a feedback on an accuracy of the imaged individual, and
    wherein, if the feedback indicates an inaccurate imaged individual, proceeding to perform the camera function to assist the user in performing the image capturing action on the identity that is paired with a second highest ranked individual on the ranked list within the area of interest.

3. The computer-implemented method of claim 2, wherein, if the feedback indicates an inaccurate imaged individual, the method further comprises displaying a graphical user interface on the area of interest including each identity of the set of key individuals within the area of interest such that the user can select the identity of the set of key individuals on which to perform the camera function.

4. The computer-implemented program product of claim 1, further comprising, in a multi-individual capturing mode, performing a second camera function to assist the user in performing the image capturing action on the identity of a user-specified number of individuals that are paired with the user-specified number of highest ranked individuals on the ranked list within the area of interest.

5. The computer-implemented program product of claim 1, wherein the image capturing action includes at least one of:
    orienting an imaging device in a manner consistent with a potential intent to capture an image; and
    executing an imaging application on the imaging device.

6. The computer-implemented method of claim 1, wherein the automated action comprises a red-eye elimination function.

7. The computer-implemented method of claim 1, wherein the automated action comprises a flash function.

8. The computer-implemented method of claim 1, wherein the camera function is performed based on an intent to perform the image capturing action.

9. The computer-implemented method of claim 1, wherein the camera function is performed based on a directional pointing of a camera.

10. The computer-implemented method of claim 1, wherein, in response to performing the camera function in the single individual capturing mode, requesting that the user submit a feedback on an accuracy of the imaged individual, and
    wherein, if the feedback indicates an inaccurate imaged individual, proceeding to perform the camera function to assist the user in performing the image capturing action on the identity that is paired with another ranked individual on the ranked list within the area of interest.

11. The computer-implemented method of claim 1, wherein a factor for determining what makes the individual a key individual of the set of key individuals is preset by the user, and
    wherein the factor includes:
        a notoriety;
        a net worth; and
        a success value.

12. A computer program product for contextual zoom control, the computer program product comprising a non-transitory computer readable storage medium having program instructions embodied therewith, the program instructions executable by a computer to cause the computer to perform:
    in a single individual capturing mode, performing a camera function to assist the user in performing an image capturing action on an identity that is paired with a highest ranked individual on a ranked list within a set of key individuals attending an event,
    wherein, in response to performing the camera function in the single individual capturing mode, requesting that the user submit a feedback on an accuracy of the imaged individual, and
    wherein, if the feedback indicates an inaccurate imaged individual, proceeding to perform the camera function to assist the user in performing the image capturing action on the identity that is paired with a second highest ranked individual on the ranked list within the area of interest,
    wherein, if the feedback indicates an inaccurate imaged individual, the program instructions executable by the computer to cause the computer to further perform displaying a graphical user interface on the area of interest including each identity of the set of key individuals within the area of interest such that the user can select the identity of the set of key individuals on which to perform the camera function.

13. A contextual zoom control system, said system comprising:
    a processor; and
    a memory, the memory storing instructions to cause the processor to perform:
    in a single individual capturing mode, performing a camera function to assist the user in performing an image capturing action on an identity that is paired with a highest ranked individual on a ranked list within a set of key individuals attending an event, wherein, if the feedback indicates an inaccurate imaged individual, proceeding to perform the camera function to assist the user in performing the image capturing action on the identity that is paired with a second highest ranked individual on the ranked list within the area of interest, wherein, if the feedback indicates an inaccurate imaged individual, the memory further storing instructions to cause the processor to perform displaying a graphical user interface on the area of interest including each identity of the set of key individuals within the area of interest such that the user can select the identity of the set of key individuals on which to perform the camera function.

\* \* \* \* \*